United States Patent
Chen Kaidi

(10) Patent No.: US 12,223,041 B2
(45) Date of Patent: Feb. 11, 2025

(54) AUTOMATED ADJUSTMENT OF SECURITY ALERT COMPONENTS IN NETWORKED COMPUTING SYSTEMS

(71) Applicant: PAYPAL, INC., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 769 days.

(21) Appl. No.: 17/341,260

(22) Filed: Jun. 7, 2021

(65) Prior Publication Data

US 2022/0391500 A1     Dec. 8, 2022

(51) Int. Cl.
     *G06F 21/55*        (2013.01)

(52) U.S. Cl.
     CPC .......... *G06F 21/554* (2013.01); *G06F 21/552* (2013.01)

(58) Field of Classification Search
     CPC .............................. G06F 21/554; G06F 21/552
     See application file for complete search history.

(56) References Cited

U.S. PATENT DOCUMENTS

| | | | |
|---|---|---|---|
| 10,931,692 B1 * | 2/2021 | Mota | G06N 20/00 |
| 10,997,294 B2 * | 5/2021 | Kenyon | G06F 21/564 |
| 11,341,374 B2 * | 5/2022 | Batoukov | G06N 5/045 |
| 2021/0126938 A1 * | 4/2021 | Trost | G06F 21/552 |
| 2022/0198263 A1 * | 6/2022 | Guo | G06Q 50/01 |

* cited by examiner

*Primary Examiner* — Christopher A Revak
(74) *Attorney, Agent, or Firm* — Haynes and Boone, LLP

(57) ABSTRACT

There are provided systems and methods for automated adjustment of security alert components in networked computing systems. An entity, such as an electronic transaction processor for digital transactions, may utilize threat detection within a security information and event management system. The threat detection may implement one or more processes to tune security alerts automatically, which can be done prior to deployment. A security alert may be broken into modular components, which may be run progressively, in increasing sampling numbers, against a set of computing logs to identify hits. The hits are compared to an expected proportion for each modular component to determine whether the modular component is providing proper results. Further, threat detection may utilize a system to obtain justifications for potentially malicious behavior to eliminate false positives. This may be done automatically when detecting suspicious activities.

20 Claims, 6 Drawing Sheets

AUTOMATED ADJUSTMENT OF SECURITY ALERT COMPONENTS IN NETWORKED COMPUTING SYSTEMS

TECHNICAL FIELD

The present application generally relates to security and risk detection systems in computing environments, and more particularly to detecting whether security alerts and components of those alerts require adjustment and automating adjustment of security alert to reduce unnecessary noise and/or tune underreporting security alerts, according to various embodiments.

BACKGROUND

Online service providers may provide services to different users, such as individual end users, merchants, companies, and other entities. When providing these services, the service providers may provide an online platform that may be accessible over a network. Users may utilize a computing device to access and utilize different processes, operations, applications, and platforms of the service provider available over the network, as well as request processing of data. As hackers and other malicious users or entities become more sophisticated, they may perform different computing attacks and other malicious conduct against the service provider. For example, fraudsters may attempt to compromise sensitive data, or attempt to perform fraudulent electronic transaction processing or account takeover. Service providers may thus utilize security and risk detection systems to identify suspicious behavior and malicious activities. However, as computing attacks become increasingly sophisticated, these systems require continual fine tuning of security alerts and risk rules in order to properly identify malicious behavior and not create false positives with valid activities in order to reduce risk, fraud, potential damage to the service provider's computing platforms, and/or exposure of data. In particular, improperly tuned security alerts may be problematic in that an under-tuned alert (e.g. not enough alerts being issued) may fail to notify a service provider of malicious activity, while an over-tuned alert (e.g. too many alerts being issued) may overwhelm a service provider with alerts for behavior that may not actually be malicious and/or behavior that does not require special attention from technical security staff.

Figure 1:
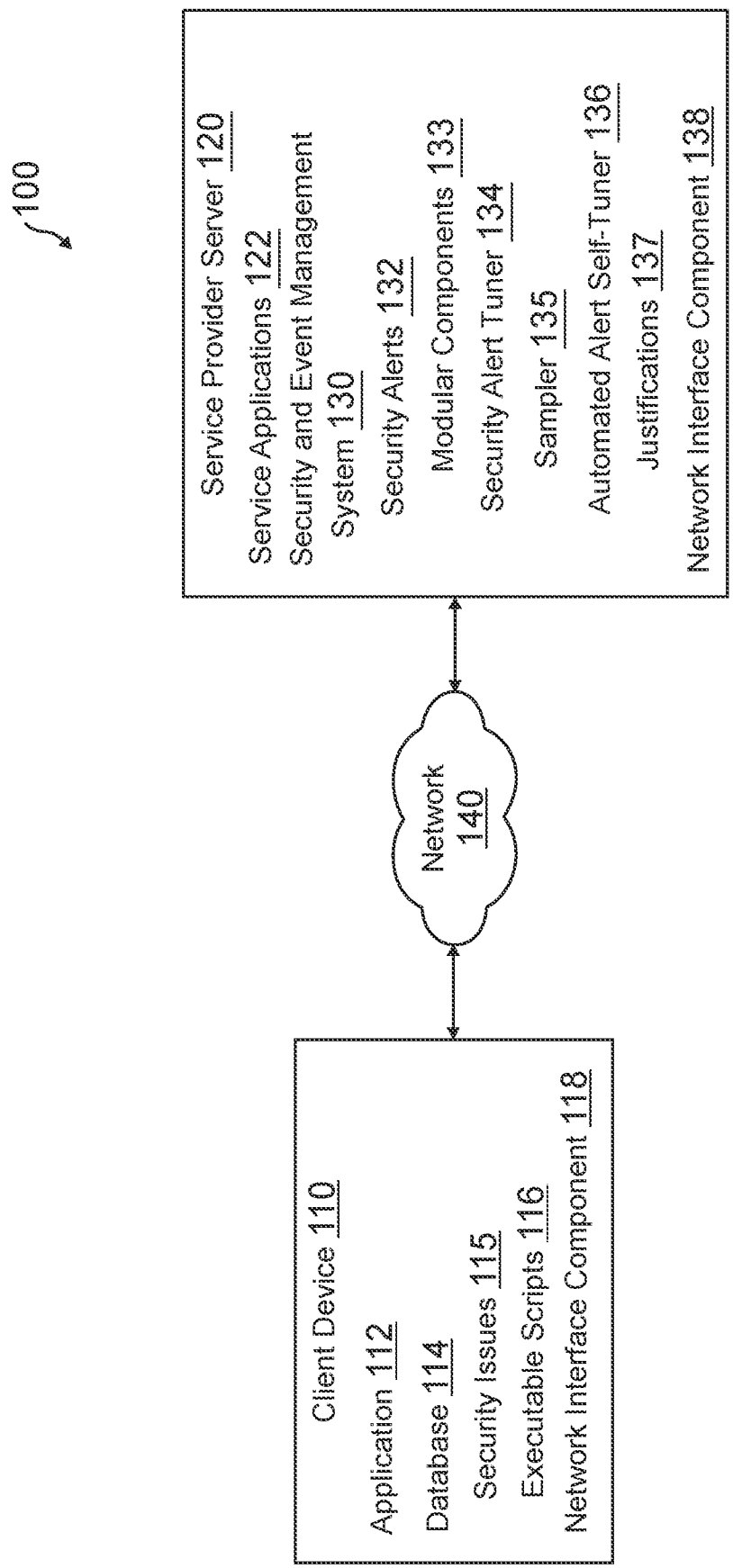
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for automated adjustment of security alert components in networked computing systems. Systems suitable for practicing methods of the present disclosure are also provided. Also note that while various examples, structures, techniques, etc. may be described with respect to a service provider in this specification, these structures, techniques, etc. are generalizeable and are applicable to any entity that uses security alerts according to various embodiments.

In an entity's (e.g. service provider's) systems, such as online platforms and systems that allow users to interact with, use, and request data processing, the service provider may provide a computing architecture that may face different types of computing attacks coming from malicious sources over a network. For example, a malicious actor may initiate a computing attack on the computing environment of the service provider, such as an HTTP smuggling request, denial-of-service (DoS) and distributed denial-of-service (DDoS) attacks, a fraudulent transaction processing request, a password attack, a web abuse (e.g., account enumeration, brute-force attacks, SQL injection), or other type of computing attack. These computing attacks may introduce risk to resources of the service provider, secure and sensitive data, and/or fraud and loss by the service provider.

In order to identify, remedy, stop, and/or prevent these computing attacks and other abuses of the service providers, the service providers may utilize security alert and risk rules that identify real-time computing activities that may need review by computing devices using the risk rules and/or analysis of computing logs of these devices' interactions for suspicious behavior. Security alerts and/or rules may be custom coded for a specific task or may correspond to "out of the box" (OOTB) solutions. With both types of alerts, and especially OOTB that may not be specifically coded for a solution and/or system, the risk rules may not be properly tuned or adjusted, that is, they may cause too many alerts and false positives, or may result in too few alerts and ignore false negatives. Thus, a service provider's system may break down a security alert into modular components and test each component sequentially to determine if match rates for a sampling size of network traffic and/or computer event logs meet expected results for that modular component. If a modular component does not, that specific section of the alert and computing code may be more finely tuned or adjusted to achieve adequate and/or expected results. Thereafter, a security alert may be automatically adjusted or tuned by detecting logs from users that resulted in the alert and querying the user whether a justification exists for the alert.

For example, a service provider's threat detection system may receive a computing code for a new security alert and/or rule (e.g., an OOTB, however, custom coded rules may also require tuning). The threat detection system may implement a security alert and/or risk analysis system that identifies suspicious and/or malicious computing behavior, such as those that result in computing attacks against system resources, account takeover, and/or fraud. The threat detection may identify different modular components or sections within the received security alert, where each modular component includes computing code (e.g., one or more lines of code) that may cause filtering, flagging, and/or hits within computing logs, such as network traffic logs, computer event logs, or other log files. For example, a pseudo-code of a first modular component of a security alert may be: 'comment ("specifying scope of data source(s)")' (datasource=WinEventLog: Security EventCode=4625) OR (datasource=sshd action=failed). Such code may be utilized with Windows Event Logs (commonly referred to as a "WinEventLog" or the like) and may cause flagging or hits for matching computing logs.

Computing logs may therefore correspond to log files that record events and corresponding activities of computing devices. Computing logs may include activities associated with events on a computing system, such as those associated with an operating system (OS) and/or software as those execute on a computing device. The computing logs may also record network traffic activities and data, database transactions associated with changes to databases and corresponding data, messages, and/or server activities. A computing log may include different data fields having attribute data in each field, such as a firewall log from web traffic. An exemplary network traffic log may include data such as client hints, a user agent string, source (e.g., a source IP address), source port, method, account number, status, uniform resource identifier (uri)path, destination, destination port, bytes out, bytes in, etc.

When gathering computing logs for testing modular components of a security alert, the service provider may first identify and/or select a set of computing logs over a time period or time frame, such as event logs from computing devices that are detected and/or received over an X hour (or second(s), minute(s), day(s), week(s), etc.) time period, on a select time and/or date, and/or of a selected length in the past (e.g., X second(s), minute(s), hour(s), day(s), week(s), etc. ago). In some embodiments, the computing logs may correspond to network traffic logs coming through as web traffic via a particular domain or platform of the service provider during the selected time period. For example, the service provider may select a one-hour time period where the service provider may determine and collect all computing logs or a subset of the computing logs (e.g., taken through sampling over that time period). The logs and/or time period may be selected based on the service provider identifying other computing attacks during that time period, to identify an extent and/or source of the computing attack during the time period, and/or based on minimum or maximum number of logs. For example, the computing log number selected for analyzing the modular components of a security alert over a one-hour period may correspond to five million log entries.

Once the set of computing logs have been determined for screening and tuning the security alert, the service provider's threat detection system may determine a schema to test the modular components of the security alert. This schema may detect if certain modular components are over-tuned (e.g., creating too many false positives and noise) or under-tuned (e.g., missing true positives, causing section breaks that have zero matching logs, and/or generating too few alerts). The schema may proceed in a sequential order and successively after the previous modular component. At a first modular component, such as the first computing code of the security alert selected for the first modular component, a sampling number or percentage may be lower (e.g., 10% or a high sampling rate of the computing logs) so that a fewer number of the computing logs are taken for testing the first modular component. Thus, out of five million log entries, only 500,000 may be used to test the first modular component.

However, the schema may proceed to sample a larger number successively for the following modular components, such as by changing the sampling rate from 10% for the first modular component, to 20% for the following second, then 30% for the third, 40% for the fourth, and 100% for the fifth, where five modular components may make up the security alert. By having the sampling percentage increase in such a manner, as the schema moves down the sections, a number of absolute results from hits or matching log entries may reduce, so changing the sampling rate may ensure that accuracy levels remain the same when collecting hits and matches, while still reducing the computation load on the service provider's computing systems and resources (e.g., servers).

The schema may also designate, for each modular component and sampling rate, a corresponding expected proportion of the computing logs that create hits or matches with the computing code of the modular component. For example, with the first modular component and code, the schema may expect 95-100% of the computing logs to match that modular component and create a hit or alert. However, as the schema moves down the modular components and the requirements from the code of the modular components becomes stricter, the schema may expect fewer results and therefore a lower proportion or percentage of the sampled computing logs. For example, for a following second modular component, the expected proportion may be 70-100%, then 20-80% for the third, 0-30% for the fourth, and 0-1% for the fifth.

The service provider's security alert screener of the threat detection system may then execute the schema to successively filter the computing logs for each modular component based on the sampling rates, where the filtering may detect the hits and/or matches for the modular components with the computing logs. Thus, an actual proportion of the resulting hits or matches for each modular component from the sampled computing logs for that modular component may be determined. This may correspond to the number of logs and data matching the modular component (e.g., causing the hit) as compared to the total number of logs used to screen the modular component. Once the computing logs are filtered by those causing hits and then compared to the total number of tested logs (e.g., based on the sampling rate), the expected proportion of results may be output via a user interface.

The user interface may compare the actual proportion of the results to the expected proportion. If the actual proportion falls within the range of the expected proportion, the service provider may flag that modular component as ready for rollout or at least meeting the expected proportion of results for the threat detection system. The user interface may show the results for each modular component. If each modular component meets the expected proportion, the security alert tuner may flag the security alert as ready for rollout and/or not requiring further tuning to meet currently expected results. The threat detection system may then automatically deploy the security alert into a security and threat detection system.

However, if a modular component is flagged as not meeting the expected proportion, such as if the actual proportion is too high or too low, the security alert screener may then determine that the identified section of the security alert requires tuning or adjusting. This may include identifying if the modular component is too noisy (e.g., the actual proportion is too high and outside of the expected proportion) or is generating too low levels of alert (e.g., the actual proportion is too low and outside of the expected proportion). Thus, the security alert screen may flag the individual modular components requiring tuning without requiring testing of each modular component and reducing the computational resources required to test each modular component by utilizing a lower number of computing logs for screening (e.g., through sampling). The service provider may then run one or more automate processes to tune the security alert and/or modular components of the security alert.

In various embodiments when automatically tuning a noisy security alert, such as one that may be generating too many false positives and alert, and/or when further removing false positives, the service provider may utilize an alert self-tuner that determines context and justifications for incidents flagged by security alerts. In order to do so, a security alert is taken, and a scheduled job is run and executed with the security alert to detect computing logs that cause an alert and/or are flagged as an incident due to computing activities detected from the log. When determining if the detected activities are malicious and/or require analysis as a true positive (e.g., requiring an escalation), the alert self-tuner may determine whether there are justifications for one or more of the activities. For example, if there are greater than a threshold number of unique users providing a justification for a specific activity, that activity may be excluded from the detected activities that are flagged by the security alert. However, if not, the alert self-tuner may then request justifications from users associated with the flagged activities via messages sent to those users. However, in order to not overly message users (e.g., spam users with messages), the alert self-tuner may limit the number of messages to a set number. In some embodiment, this may be based off a set number if no previous messages have been sent or may be associated with a number of true positives from a previous time period (e.g., two times the number of true positives).

Based on the number of messages determined to be sent (and/or the number of users to be messaged), the service provider may then determine whether a user associated with the flagged activities should be messaged or not. For example, a flagged activity for a user may be hashed by removing identifying information (e.g., username, host name, etc.) and creating a hash unique to the activity and/or process that was flagged, but not the user. This may be compared to hashes of previously flagged and/or justified activities. If matching and the user has not been queried for a justification, then a request may be sent. The alert self-tuner may wait for a response and, if after a certain time has passed, may re-message the user, potentially using a different communication channel (e.g., email or text instead of an account or push notification). If the user provides a response, a justification may be added to a suppression list for the corresponding activity. The suppression list may later be used to exclude similar recorded entries from creating incidents. Thus, in certain embodiments, a requirement for five recorded suppression entries (justifications) from different users in the suppression list may be required to then exclude the similar recorded entries.

However, if the user does not respond, the activity may be examined to determine if actionable of a false positive. If a true positive, escalation may occur, and the activity and user may be examined as potentially malicious. However, if a false positive, the security alert may be examined for additional tuning. In other embodiments, it may be determined that the user provided context and/or a justification for the hash of the activity that matches a hash of a past justified activity. In such embodiments, a manager may be required to provide approval of such activity in order to protect against an insider threat. If a manager's approval is provided, then the flagged activity may be skipped and excluded.

In other embodiments, the hash of the flagged activity may not match a stored and justified hash of one or more activities. In such embodiments, a hash entropy, or difference between hash values and uniqueness based on the hashing algorithm or function for certain parts of the log entry, may be calculated. In such embodiments, the log entry for the computing log may be stripped of user and/or machine identifiers and hashes may be compared of the stripped data from the log entry. However, if that doesn't create a match, entropies of various portions or sections of the log entries may be compared to check for similarities. If the entropy is similar, then the user may be queried for a justification and it may be determined if the user has responded. If the user has responded, a justification may be added to the list for the activity (and hash) with the security alert. However, if not, the activity may be escalated, examined as either a true positive or false positive, and further processed to determine if the alert requires tuning. However, if the user has not previously provided a context and a justification, a message may be transmitted to the user. Messages transmitted to the user may, however, be limited to the maximum number, such as based on a maximum number from, or in proportion to, the true positives over the previous time period. For example, if the true positive rate is 20%, the number of messages may be calculated as 20%*(the number of total results in a time period).

In this regard, the service provider may deploy security alerts for a threat detection system, such as a security information and event management team. This may include security appliances, such as security analytics, endpoint detection response (EDR), user and entity behavioral analytics (UBA), database security, cloud analytics, and threat simulation. For example, a service provider, which may provide services to users including electronic transaction processing such as online transaction processors (e.g., PayPal®), may allow merchants, users, and other entities to process transactions, provide payments, and/or transfer funds between these users. The user may also interact with the service provider to establish an account and provide other information for the user. Other service providers may also provide computing services, including social networking, microblogging, media sharing, messaging, business and consumer platforms, etc. In order to utilize the computing services of a service provider, the service provider may provide a computing architecture and environment where the users may access and utilize operations provided by the service provider.

However, malicious end users and/or computing devices (e.g., computing devices that may include malware, viruses, and the like that may be hijacked to automate computing attacks) may attempt to abuse the service provider's systems through computing attacks. Thus, the aforementioned processes may be utilized to provide automated security alert deployment to protect these computing resources. These may be deployed with less computing resources and computational intensity, thereby reducing server and data processing loads and providing faster and automated deployment. Further, security alerts may be more finely tuned to provide better results and more accurate threat detection in computing systems.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider server 120 in communication over a network 140. Client device 110 may be utilized by a malicious user or other bad actor to perform some computing attack over network 140, where service provider server 120 may provide various data, operations, and other functions over network 140. However, in other embodiments, client device 110 may also be compromised, and therefore include security issues that may affect service provider server 120. In this regard, client device 110 may direct the computing device against the systems of service provider server 120, which may adversely impact services provided by or content accessible through service provider server 120. Service provider server 120 may utilize security rules to detect activities and computing logs that indicate suspicious or malicious behavior, where the security rules may be analyzed for deployment and tuning using the operations and components discussed herein.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains an application 112, a database 114, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute software modules and associated components of client device 110 to provide features, services, and other operations for a user over network 140, which may include accessing and/or interacting with service provider server 120. In this regard, application 112 may correspond to specialized software utilized by a user of client device 110 that may be used to access a website or UI provided by service provider server 120 to perform actions or operations. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information (e.g., a website for a merchant), presenting the website information to the user, and/or communicating information to the website.

However, in other embodiments, application 112 may include a dedicated application of service provider server 120 or other entity (e.g., a merchant). Application 112 may be associated with account information, user financial information, and/or transaction histories. However, in further embodiments, different services may be provided via application 112, including messaging, social networking, media posting or sharing, microblogging, data browsing and searching, online shopping, and other services available through service provider server 120. Thus, application 112 may also correspond to different service applications and the like that are associated with service provider server 120.

When using application 112, a bad actor may execute a computing attack or automated script to perform some operation to compromise service provider server 120 and/or conduct fraud. However, not all uses, and in some cases none of the uses, of client device 110 and application 112 may be malicious. In some embodiments, application 112 may further be compromised, such as by one or more security issues 115 that cause identification of possibly suspicious behavior in computing logs. In further embodiments, executable scripts 116 may be executed with application 112, which may automate some function. In some embodiments, executable scripts 116 may correspond to account enumeration, multiple login attempts, scripted form filling, and the like. However, other types of executable scripts 116 may also be executed to automate valid or normal functions on client device 110 and/or in application 112.

Thus, where application 112 is being used to attempt to discover secret or sensitive information, takeover an account, request fraudulent electronic transaction processing, or otherwise perform an illegal action or malicious conduct that is barred by the rules and regulations of service provider server 120, a security alert may be tuned to return a true positive and identify client device 110 and/or a corresponding user as malicious. This may cause an escalation to stop, halt, or repair the damage performed by application 112 with service provider server 120. In some embodiments, other types computing attacks may correspond to a HTTP smuggling request, denial-of-service (DoS) and distributed denial-of-service (DDoS) attacks, a fraudulent transaction processing request, a password or eavesdropping attack, a session hijacking or Man-in-the-Middle (MitM) attack, or other type of computing attack. However, in other embodiments, application 112 may be behaving validly and may create a false positive, such as if a shell script is executing to perform a valid computing operation. During these activities with service provider server 120, a corresponding computing log may be generated and used by service provider server 120 for tuning of a security alert and/or detection of malicious activity.

Client device 110 may further include database 114 stored on a transitory and/or non-transitory memory of client device 110, which may store various applications and data and be utilized during execution of various modules of client device 110. Database 114 may include, for example, identifiers such as operating system registry entries, cookies associated with application 112 and/or other applications, identifiers associated with hardware of client device 110, or other appropriate identifiers, such as identifiers used for payment/user/device authentication or identification, which may be communicated as identifying the user/client device 110 to service provider server 120. Moreover, database 114 may store operations and data associated with security issues 115 and/or executable scripts 116. For example, database 114 may store malicious and/or compromised data for computing attacks, scripted and/or automation bots, and the like that may correspond to security issues 115 and/or executable scripts 116. In further embodiments, database 113 may also store log data, such as computer event logs for OS and/or application events that may be provided to service provider server 120.

Client device 110 includes at least one network interface component 118 adapted to communicate with service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide threat detection systems for computing systems and infrastructure of service provider server 120 using alerts tuned by security alert screening and self-tuning operations. In this regard, service provider server 120 includes one or more processing applications which may be configured to interact with client device 110 to determine one or more computing logs from client device 110, which may be used to tune security alerts in threat detection, security, and event management systems. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes service applications 122, a security and event management system 130, a database, and a network interface component 138. Service applications 122 and security and event management system 130 may correspond to executable processes, procedures, and/or applications with associated hardware. In other embodiments, service provider server 120 may include additional or different modules having specialized hardware and/or software as required.

Service applications 122 may correspond to one or more processes to execute modules and associated specialized hardware of service provider server 120 to perform a service to end users of service provider server 120, such as process a transaction between users or entities or provide other computing services. In this regard, service applications 122 may correspond to specialized hardware and/or software used by a user associated with client device 110 to perform one or more services, which may be protected from computing attacks, fraudsters, and the like using security and event management system 130. In one embodiments, service applications 122 may be used to establish an account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 120. The payment account may be accessed and/or used through a browser application and/or dedicated payment application executed by client device 110 to engage in transaction processing through service applications 122. Service applications 122 may also correspond to messaging, social networking, media posting or sharing, microblogging, data browsing and searching, online shopping, and other services available through service provider server 120.

Security and event management system 130 may correspond to one or more processes to execute modules and associated specialized hardware of service provider server 120 to provide a framework to detect and protect against computing attacks by tuning and deploying security alerts for threat detection. In this regard, security and event management system 130 may correspond to specialized hardware and/or software used by service provider server 120 to receive security alerts 132 having modular components 133. Security alerts 132 may correspond to the alerts and/or rules used to detect suspicious and/or malicious activities by computing devices, such as client device 110. Security alerts 132 may correspond to those custom coded and/or implemented for a particular solution and/or OOTB alerts that may be implemented in a threat detection system. Thus, security alerts 132 may require tuning prior to deployment.

In this regard, a security alert tuner 134 may be executed by security and event management system 130 to tune security alerts 132 so that one or more alerts and/or rules are ready for deployment (e.g., generating an expected number of alerts or flags without too creating many false positives or missing true positives). In this regard, a sampler 135 may be used to determine a set of computing logs over a time period. The time period may be designated by an administrator or end user, such as a data scientist or engineer analyzing security alerts 132 for deployment. In other embodiments, the time period may be automatically selected based on security alerts 132 or as a standard configuration for the corresponding threat detection system (e.g., using logs from a recent time period to analyze newer threats and computing activities). Each computing log may include different fields having attributes may include different data corresponding to the particular computing log, computing device (e.g., client device 110), and/or activity performed by that computing device. Sampler 135 may also designate the sampling rates of the computing logs for each of modular components 133 when tested, such as by using a high sampling rate for initial ones of modular components 133 for one of security alerts 132 and reducing to little or no sampling by the last of those modular components 133 for that security alert.

Security alert tuner 134 may then designate expected proportions of hits or flags for each of modular components 133 for one of security alerts 132. For example, one of security alerts 132 may have five of modular components 133, where each section of those modular components may have a corresponding hit rate or expected proportion of returned results and flags for the computing logs that are sampled and analyzed for that modular component. In some embodiments, the expected proportions and their corresponding ranges may be configurable by an administrator, data scientist, and/or engineer when screening a security alert for tuning, may be designated by the type and/or deployment platform for the security alert, and/or may be set for the threat detection system. Security alert tuner 134 may then execute a schema associated with modular components 133, sampler 135, and the expected proportions for modular components 133 in order to determine whether an actual proportion of results from each of modular components 133 that was tested falls within the expected proportions for that modular component. If so, that modular component may be designated as providing the proper number or proportion of hits or flags within the sampled computing logs. However, if not, the corresponding modular component's section may be flagged in a user interface for review and tuning.

Security and event management system 130 may further provide an automated alert self-tuner 136 that may automatically tune an alert that is providing too much noise and generating too many alerts (e.g., too many false positives). This may include operations to generate and/or use justifications 137 in order to filter out and remove activities by computing devices that were flagged or caused an alert to be generated. In this regard, when suspicious activity comes through from a computing device and/or is detected in a computing log (e.g., if historical logs are utilized in place of real-time data on activities by computing devices), automated alert self-tuner 136 may determine whether one of justifications 137 exist to remove the activity from further analysis. If so, the activity may be considered a false positive and not analyzed as potentially a true positive and therefore malicious.

However, if not, automated alert self-tuner 136 may execute a process to generate another one of justifications 137 or escalate the activity as a true positive and therefore malicious activity. A hashing process may be used to hash the activity and/or process detected as suspicious without identifying information, which may be stored with justifications for identification of the justified activity and/or used to compare to other justifications to detect a hash entropy between hashes determined after removing identifying data and/or using sections of computing logs. The process may message a set number of users, which may be a threshold defined as a function or number of true positives over a previous time period. If the users that are messaged are able to provide a context and justification, the justification may be saved with a hash of the activity to remove future false positives. However, if not, the activity may be reviewed as a potential true positive and therefore escalated for security analysis.

Additionally, service provider server 120 includes a database used to store information, which may be used with client device 110 and/or the operations of service applications 122 and security and event management system 130. The database may store various identifiers associated with client device 110. The database may also store account data, including payment instruments and authentication credentials, as well as transaction processing histories and data for processed transactions. The database may store financial information or other data generated and stored by service applications 122. The database may also store computing logs that may be analyzed and/or used for tuning of security alerts. In addition to or alternatively, the database may store computer or machine executable instructions that when executed, cause the computer or machine or system associated with either to perform various operations as discussed herein.

In various embodiments, service provider server 120 includes at least one network interface component 138 adapted to communicate client device 110 and/or other devices, servers, or resources over network 140. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
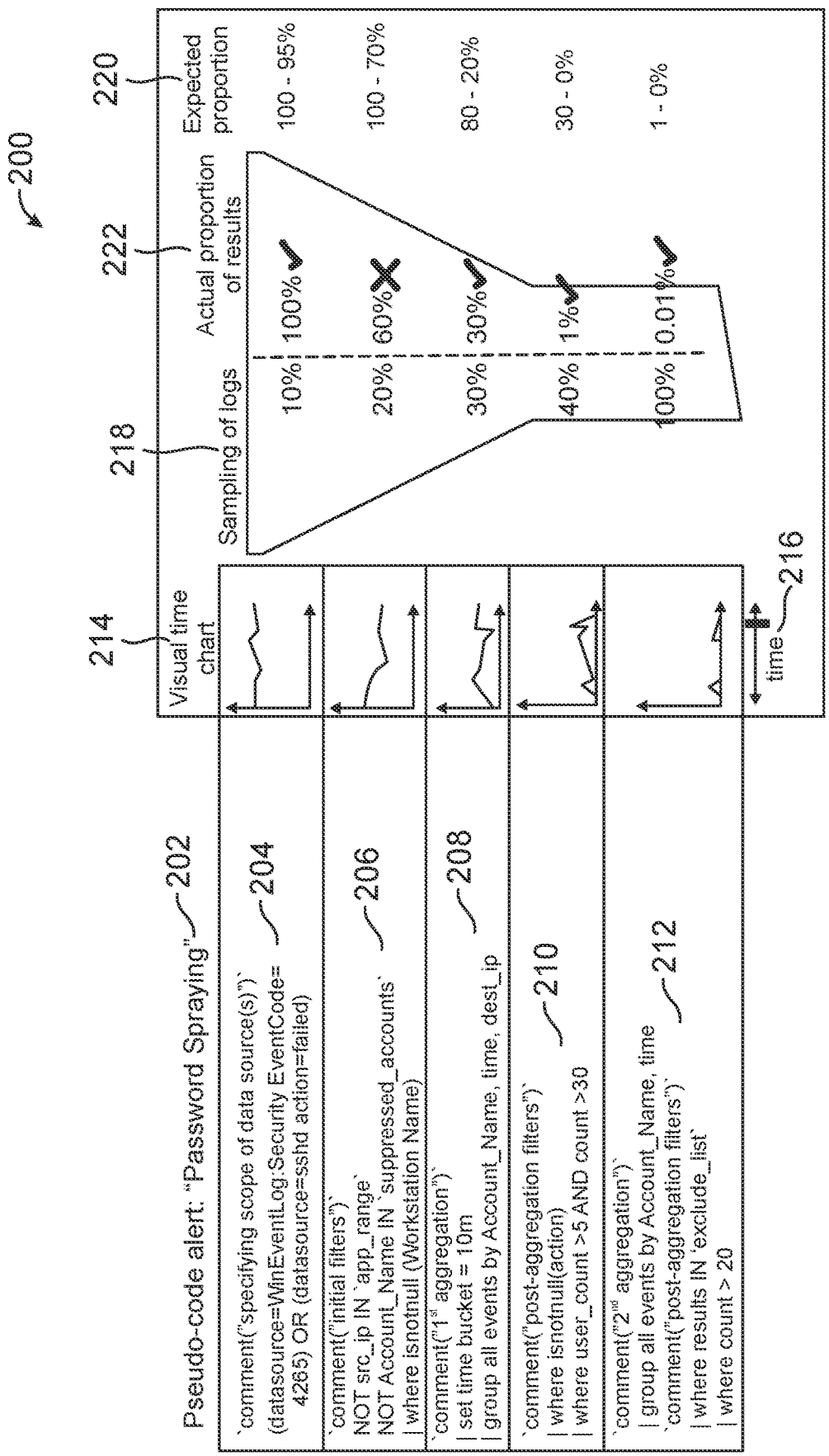
FIG. 2 is an exemplary diagram of a test visualization for modular components of a security alert to determine if a component is not properly tuned for deployment, according to an embodiment.

FIG. 2 is an exemplary diagram 200 of a test visualization for modular components of a security alert to determine if a component is not properly tuned for deployment, according to an embodiment. Diagram 200 of FIG. 2 includes a pseudo-code alert 202, which may correspond to "password spraying" and may be tested using security alert tuner 134 of security and event management system 130 for threat detection, discussed in reference to system 100 of FIG. 1. Pseudo-code alert 202 attempts to alert a threat detection system of a computing attack associated with password spraying. Such a computing attack may correspond to a brute-force type attack where a password may be used against target compromised accounts before proceeding to another password, which may be facilitated through the use of a script to automate a computing bot to perform such data entries and login attempts.

In order to test pseudo-code alert 202, the corresponding code and operations are used to detect flagged activities and behaviors of computing devices that may require escalation (e.g., to prevent and/or remediate malicious conduct by users and computing devices). In this regard, pseudo-code alert 202 is shown with five modular components or sections, modular components 204, 206, 208, 210, and 212. Pseudo code is shown for each of modular components 204, 206, 208, 210, and 212, which corresponds to the code implemented to detect if a computing activity in a computing log creates a hit and flags that computing log. A schema may be used to screen each of modular components 204, 206, 208, 210, and 212 to determine whether each is flagging and creating hits for a predicted or expected proportion of the computing logs for the tested modular component.

Initially, modular component 204 may be expected to receive many hits due to the limited number of filtering and/or hit requirements for computing logs that are searched and analyzed using the code for modular component 204. However, the overall security alert for pseudo-code alert 202 and the corresponding code used to filter computing logs for hits and/or flags of the activities in those computing logs becomes stricter as diagram 200 proceeds in a downward direction for modular components 204, 206, 208, 210, and 212. For example, while modular component 204 is expected to create a large number of, if not all, hits in the sampled computing logs (e.g., based on few requirements or filters and/or broad requirements or filters used for modular component 204), modular component 212 may expect few or any hits and flags. However, screening each modular component alone against a batch of computing logs may take significant time (e.g., two or more minutes, which add significant time over many security alerts and modular components), as well as waste significant server and/or processing resources.

In order to reduce computational resources used to screen security resources, the service provider may utilize sampling rates and numbers for a set of computing logs. First, the security alert tuner may determine a set of computing logs. Visual time chart 214 shows a visualization of a time period and a number of hits for computing logs during that time period. In this regard, a time period for establishment and/or selection of computing logs used to screen pseudo-code alert 202 may be set using time 216. The time period may correspond to a selected date and time (e.g., between 2:00-3:00 PM on January 2), for a select distance in the past (e.g., one hour of computing logs from one week ago), and/or for a selected time period (e.g., one hour of logs, including time of day and/or day of week). For example, the service provider may determine five million computing logs received by the service provider during a one-hour period. The computing logs may further include different fields that may be found within the logs, where each field includes different field data, values, or other information, which may be analyzed for hits based on modular components 204, 206, 208, 210, and 212.

In order to screen the computing logs, the security alert tuner implementing diagram 200 may then determine a sampling of logs 218 and an expected proportion 220. The values and/or percentages for sampling of logs 218 and expected proportion 220 may be established by a user screening pseudo-code alert 202 and/or may be automatically set based on the corresponding security alert and/or implementation platform. Sampling of logs 218 may correspond to a sampling rate or number, which increases in a percentage of the computing logs that are sampled proceeding in a downward direction for modular components 204, 206, 208, 210, and 212. As shown in diagram 200, sampling of logs 218 increases in percentage of sampling of the computing logs moving in a downward direction so that for modular component 204, 10% of logs are sampled, for modular component 206, 20% are sampled, for modular component 208, 30% are sampled, for modular component 210, 40% are sampled, and for modular component 212, 100% are sampled. This may be implemented because a number of absolute results from hits or matching log entries may reduce as the filtering and/or activity hit requirements become more stringent moving downward though modular components 204, 206, 208, 210, and 212. Thus, changing the sampling rate may ensure that accuracy levels remain the same when collecting hits and matches, while still reducing the computation load on the service provider's computing systems and resources (e.g., servers).

Further, for the schema of the security alert tuner in diagram 200, an expected proportion 220 may be set for an expected proportion of the sampled logs which return a hit for each of modular components 204, 206, 208, 210, and 212. Expected proportion 220 is shown with a high-to-low range, such as a X % highest proportion to a Y % lowest proportion. Expected proportion 220 may decrease in size as diagram 200 proceeds in a downward direction through modular components 204, 206, 208, 210, and 212. This may be caused by the more stringent requirements as pseudo-code alert 202 proceeds through modular components 204, 206, 208, 210, and 212. In this regard, a higher sampling rate may be used proceeding sequentially through modular components 204, 206, 208, 210, and 212 due to less returned results. Thus, for modular component 204, a sampling rate may be 10% and an expected proportion 100-95% may be set, for modular component 206, a sampling rate may be 20% and an expected proportion 100-70% may be set, for modular component 208, a sampling rate may be 30% and an expected proportion 80-20% may be set, for modular component 210, a sampling rate may be 40% and an expected proportion 30-0% may be set, and for modular component 212, a sampling rate may be 100% and an expected proportion 1-0% may be set.

After establishing these parameters, an actual proportion of results 222 may be determined by filtering the selected computing logs using modular components 204, 206, 208, 210, and 212 according to their sampling rate from sampling of logs 218. The filtering may identify those computing logs from the sampling rate that cause hits or flags based on the corresponding code for each of modular components 204, 206, 208, 210, and 212. For modular component 204, an actual proportion is detected as 100%, for modular component 206, an actual proportion is detected as 60%, for modular component 208, an actual proportion is detected as 30%, for modular component 210, an actual proportion is detected as 1%, and for modular component 212, an actual proportion is detected as 0.01%. Only modular component 206 is shown outside expected proportion 220, where the expected proportion is 100-70% but modular component 206 returns only 60%. Thus, modular component 206 is shown as under-tuned and requiring tuning to properly return an expected number or proportion of results. However, modular components 204, 208, 210, and 212 are shown as ready for deployment and properly tuned.

Figure 3:
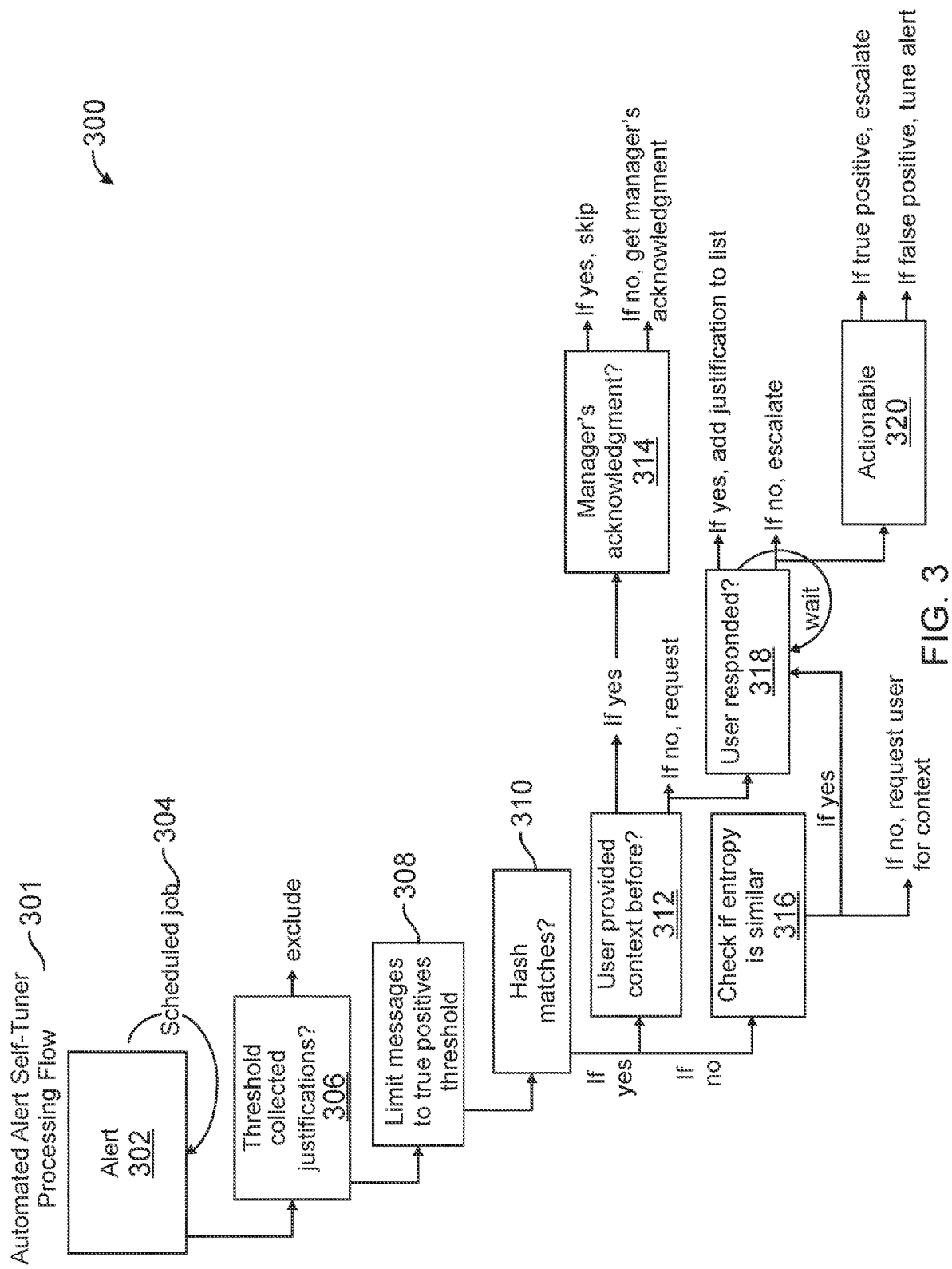
FIG. 3 is an exemplary diagram of a process that may be implemented for automatic adjustment of a security alert based on received justifications, according to an embodiment.

FIG. 3 is an exemplary diagram 300 of a process that may be implemented for automatic adjustment of a security alert based on received justifications, according to an embodiment. Diagram 300 of FIG. 3 includes an automated alert self-tuner processing flow 301, which may be executed using automated alert self-tuner 136 of security and event management system 130 for threat detection, discussed in reference to system 100 of FIG. 1. Automated alert self-tuner processing flow 301 may be executed in order to determine if a security alert is overly noisy and providing false positives when analyzing computing activities with a service provider, such as service provider server 120 of system 100. In this regard, automated alert self-tuner processing flow 301 may be used to determine context and justifications for generated alerts of activities after running a scheduled job 304 for alert 302.

In this regard, after scheduled job 304 is run, alert 302 may return flagged activities that generate alerts or notifications of potentially suspicious activity. Using one of the alerts of activities generated from scheduled job 304, the automated alert self-tuner may then determine whether the activity is justified and may be excluded, requires a message to receive a justification, or may require escalation for a true positive that indicates malicious activity. In this regard, automated alert self-tuner processing flow 301 may then determine if there is a threshold collected justification 306 in order to exclude the activity. For example, five or more justifications may be required for threshold collected justification 306 for automated alert self-tuner processing flow 301 to proceed to exclude the activity.

However, if not, automated alert self-tuner processing flow 301 may proceed to determine a number of messages to transmit to users in order to determine if additional justifications may cause the activity to be excluded. Thus, a true positives threshold 308 may be utilized by automated alert self-tuner processing flow 301 to limit the messages, which may correspond to a threshold tied to the number of previous true positives from a previous processing job. For example, two times the number of true positives may limit the number of messages sent using true positives threshold 308. However, other amounts or numbers may be used, for example, where no true positives have yet been identified, ten messages may be sent or another selected number.

Hash matching 310 is then performed to determine if a hash of the activity matches any hashes of other excluded activities that may have previously been stored with a justification. In this regard, the hashes may be determined using a hashing algorithm or function after removing user identifying information from a computing log and retaining only information specific to the flagged activity being processed by automated alert self-tuner processing flow 301. Thereafter, hash values that are stored for alert 302 may be compared. If hashes match, previous user context 312 is analyzed, which corresponds to a previous context and/or justification provided by a user of why an activity resulted in an alert (e.g., using a power shell command or script to automate some function on the user's computing device that is benign and/or unrelated to the service provider).

If previous user context 312 is provided, a manager's acknowledgement 314 may be required. This is due to the activity again causing an alert even when the same activity, and therefore, alert 302 may be functioning properly. Thus, if manager's acknowledgement 314 is provided, the activity may be skipped; however, if not, manager's acknowledgement 314 may be required to protect from insider threats to the service provider. If previous user context 312 is not provided, it may be requested from the user if the messages do not exceed true positives threshold 308. Automated alert self-tuner processing flow 301 may then determine if a user response 318 is received. If yes, automated alert self-tuner processing flow 301 may then add the justification of the user to the activity.

However, if user response 318 is not received, a wait period may ensue. After the wait period, user response 318 may again be requested from the user, and one or more other communication channels may be used to attempt to contact the user. However, if after two or more attempts to receive user response 318 is not received, automated alert self-tuner processing flow 301 may escalate the activity for review. This may include determining if it is an actionable activity 320. For example, a true positive may require escalation in order to determine the malicious user and/or device and take action to prevent or repair damage. However, if analyzed and determined to be a false negative, further tuning of alert 302 may be required and identified for an administrator, data scientist, or engineer.

In contrast, if hash matching 310 indicates no hashes match to the current activity's hash, then a hash entropy check 316 is performed to determine a hash entropy (e.g., given a previous hash block, an entropy or difference with another hash). For example, using hashing functions each new data item that is hashed may have an entropy given the previous hashed data. If hash entropy check 316 indicates the hash entropy is similar (e.g., within a threshold), it may be determined if user response 318 may be requested. This may then proceed similarly as discussed above for automated alert self-tuner processing flow 301 where, if user response 318 is received, a justification may be added for the activity. However, if not, escalation may occur and/or actionable activity 320 may be analyzed. If the hash entropy is not similar (e.g., over a threshold), then a user context may be requested for a justification within the limits of true positive threshold 308. Thereafter, automated alert self-tuner processing flow 301 may complete with processing of the flagged activity.

Figure 4A:
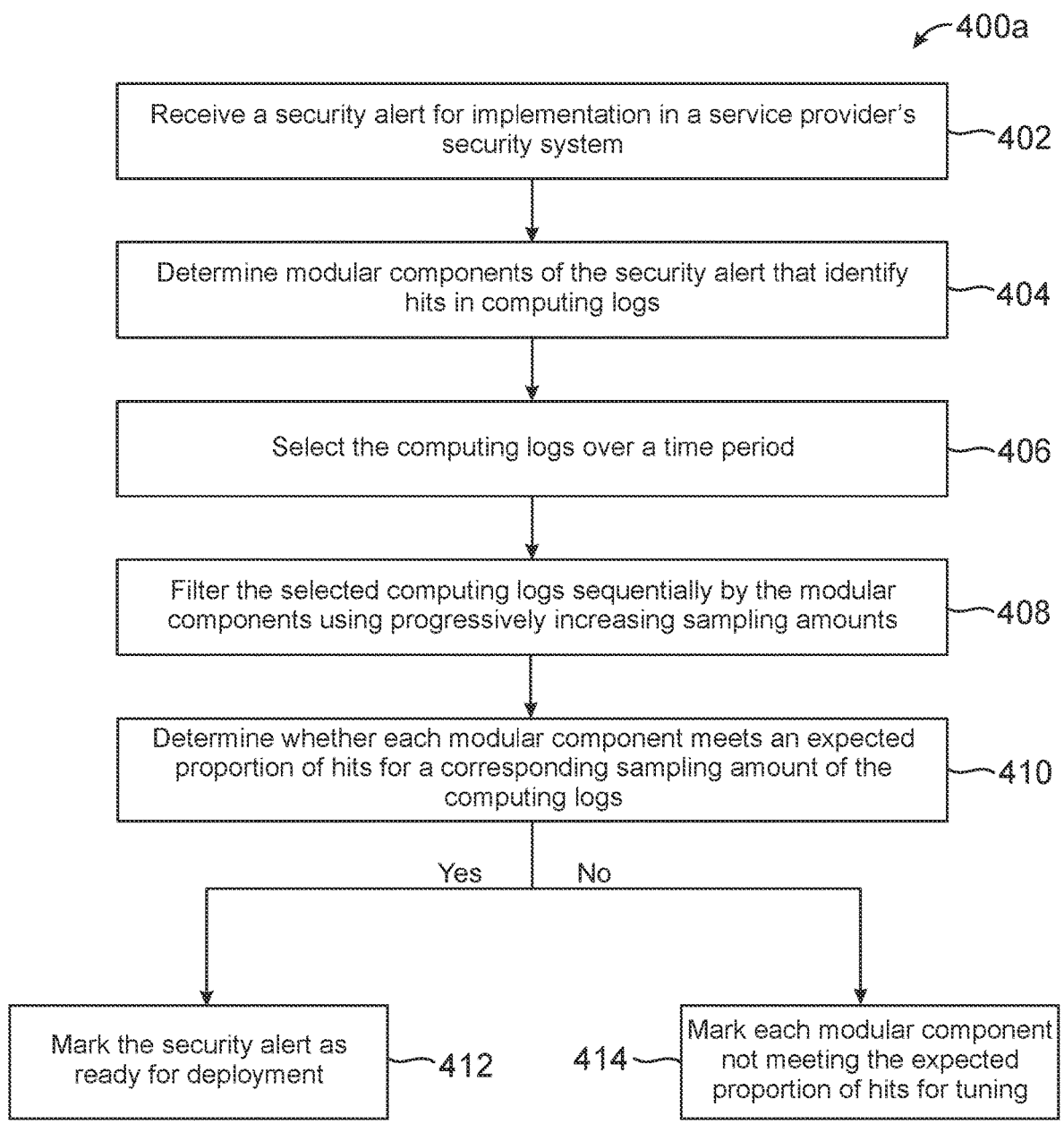
FIG. 4A is a flowchart for identifying whether one or more components of a security alert requires adjustment, according to an embodiment.

FIG. 4A is a flowchart 400a for identifying whether one or more components of a security alert requires adjustment, according to an embodiment. Note that one or more steps, processes, and methods described herein of flowchart 400a may be omitted, performed in a different sequence, or combined as desired or appropriate.

At step 402 of flowchart 400a, a security alert for implementation in a service provider's security system is received. The security alert may be modularized into sectionalized components of corresponding code that identifies and/or flags corresponding activities by computing devices in computing logs. In this regard, the security alert may require tuning in order to properly identify such activity in computing logs, such as by filtering out false positives that may appear to be malicious behavior in computing logs but actually be benign behavior that is occurring due to other processes on a computing device. At step 404, modular components of a security alert that identify hits in computing logs are determined. Those modular components may be the corresponding code that identifies certain computing activity, broken into sections or segments according to the filtering or alert capabilities, that may cause hits in corresponding computing logs.

At step 406, computing logs over a time period are selected. The computing logs may be selected based on a particular time frame and/or time period that is to be analyzed for a security alert. For example, a security alert may be implemented for high traffic volume time periods and/or time periods that may experience high numbers of computing attacks. Thus, a time period corresponding to that alert may be designated. Once the computing logs are established for alert screening, at step 408, the selected computing logs are sequentially filtered by the modular components using progressively increasing sampling numbers. For example, a high sampling rate may initially be used to reduce the number of computing logs used to screen a first, less restrictive modular component. However, the sampling number may increase and therefore utilize more of the computing logs, as the modular components are screened for the security alert. This allows for the more sensitive modular components that are more restrictive to still provide results that will be proportionate to the end security alert.

At step 410, it is determined whether each modular component meets an expected proportion of hits for a corresponding sampling number of the computing logs. Each modular component may require the corresponding actual proportion of hits to fall within a range or proportion of expected hits. For example, a third modular component may require that there be between 30-60% of computing logs to have hits and therefore flags over a time period when coding for the alert in the third modular component is run against the corresponding sampling of computing logs. This therefore, looks for the proportion of results, and uses a scaler to increase the actual results to determine the proportion. Thus, the actual hits may be scalarly increased by a number to determine the actual proportion, and then compared to the expected proportion.

If the actual proportion meets the expected proportion for each modular component, at step 412, the security alert may be marked as ready for deployment, or at least meeting expected alert rates. This may begin an automated process to implement the security alert in the corresponding threat detection system. However, if the actual proportion does not meet the expected proportion for one or more modular components, then at step 414, each modular component not meeting the expected proportion of hits is marked for tuning. This may include identifying those modular components within a user interface to designate those modular components, and their corresponding code, for tuning. In order to further tune overly noisy components, flowchart 400a may proceed to flowchart 400b of FIG. 4B.

Figure 4B:
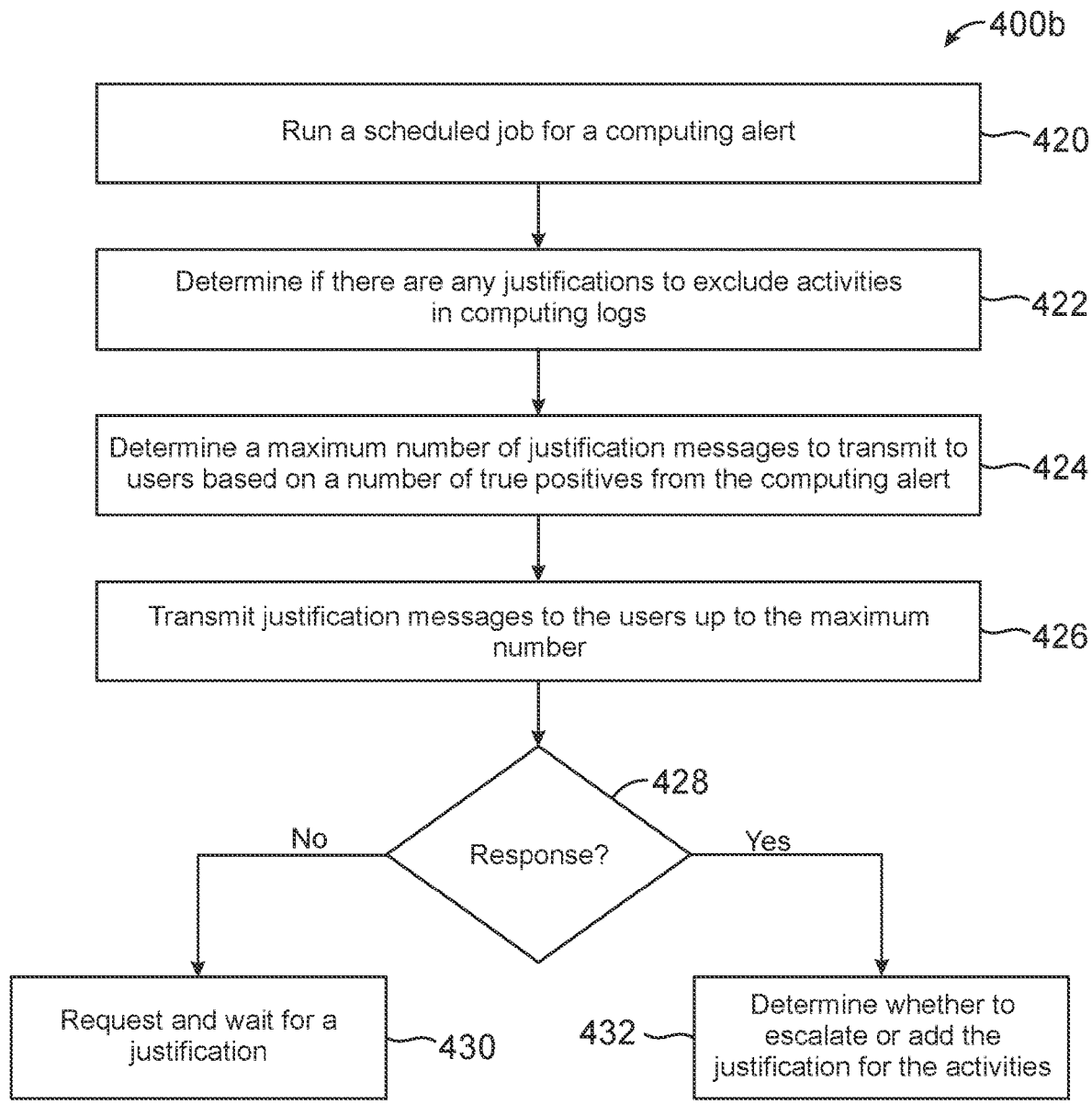
FIG. 4B is a flowchart for automatically adjusting a security alert using justifications for computing activities that caused security alert flagging, according to an embodiment.

FIG. 4B is a flowchart 400b for automatically adjusting a security alert using justifications for computing activities that caused security alert flagging, according to an embodiment. Note that one or more steps, processes, and methods described herein of flowchart 400b may be omitted, performed in a different sequence, or combined as desired or appropriate.

At step 420 of flowchart 400b, a scheduled job for a computing alert is run and executed. The scheduled job may be one to analyze computing logs to determine if any of those computing logs contain activities that are potentially suspicious and/or malicious under the designations and restricted activity set by the code of the computing alert. Thus, the scheduled job may return one or more activities from computing logs that are identified as requiring analysis. Using one or more of these logs, at step 422, it is determined if there are any justifications that exist to exclude activities from the computing logs. For example, if there are a sufficient number of justifications, such as if those exceed a benchmark or threshold number, then certain activities may be excluded because they may be considered trusted based on the justifications provided. In this regard, a power shell command or script that execute a specific function (e.g. automating scheduling or email form filling for a merchant computing device) may be considered benign or valid instead of another shell script that performs account enumeration attacks (e.g., is therefore filling different fields and/or performing different processes but may still appear as an executable script). Thus, if a justification exists for one or more activities, those activities may be excluded.

For unexcluded activities, at step 424, a maximum number of justification messages to transmit to users is determined, such as based on a number of true positives from the computing alert. The maximum number of users may be limited in order to prevent overly messaging users where a security alert may require tuning in order to reduce false positives. Thus, the maximum number of users may be limited to an order, factor, and/or function of the number of true positives, such as two times the number of true positives from a time period of a previous processing job, to prevent overly inundating users with messaging.

At step 426, justification messages are transmitted to the users up to the maximum number for the corresponding threshold. This may correspond to the maximum number allowable based on the number of true positives from a selected time period or may instead may be set by an administrator or other end user tuning the security alert. Based on this messaging, at step 428, it is determined whether a response is received. If no response is received over a time period, the user may be re-messaged regarding the potentially malicious conduct in order to justify a context of why an alert was generated based on the user's activity with their computing device. Thus, at step 430, the message may be retransmitted using another communication channel, which may be selected based on a preference or past used communication channel of the user. Therefore, step 430 may include a justification wait time period to for re-messaging users for justifications.

If no response is received during step 430, the activity that created the alert may be escalated for analysis of whether the activity created a true positive. However, if a response is previously provided during step 428, flowchart 400b may proceed to step 432. At step 432, it is determined whether to escalate the activity or add a justification. The response may include context of the user's activity that cause the corresponding security alert. For example, a user may justify computing activity that causes a computing alert by noting the valid or benign nature of the corresponding action. However, if the context and justification is continuing to generate alert, the activity may be escalated to a manager or administrator in order to approve the activity and prevent insider threats.

Figure 5:
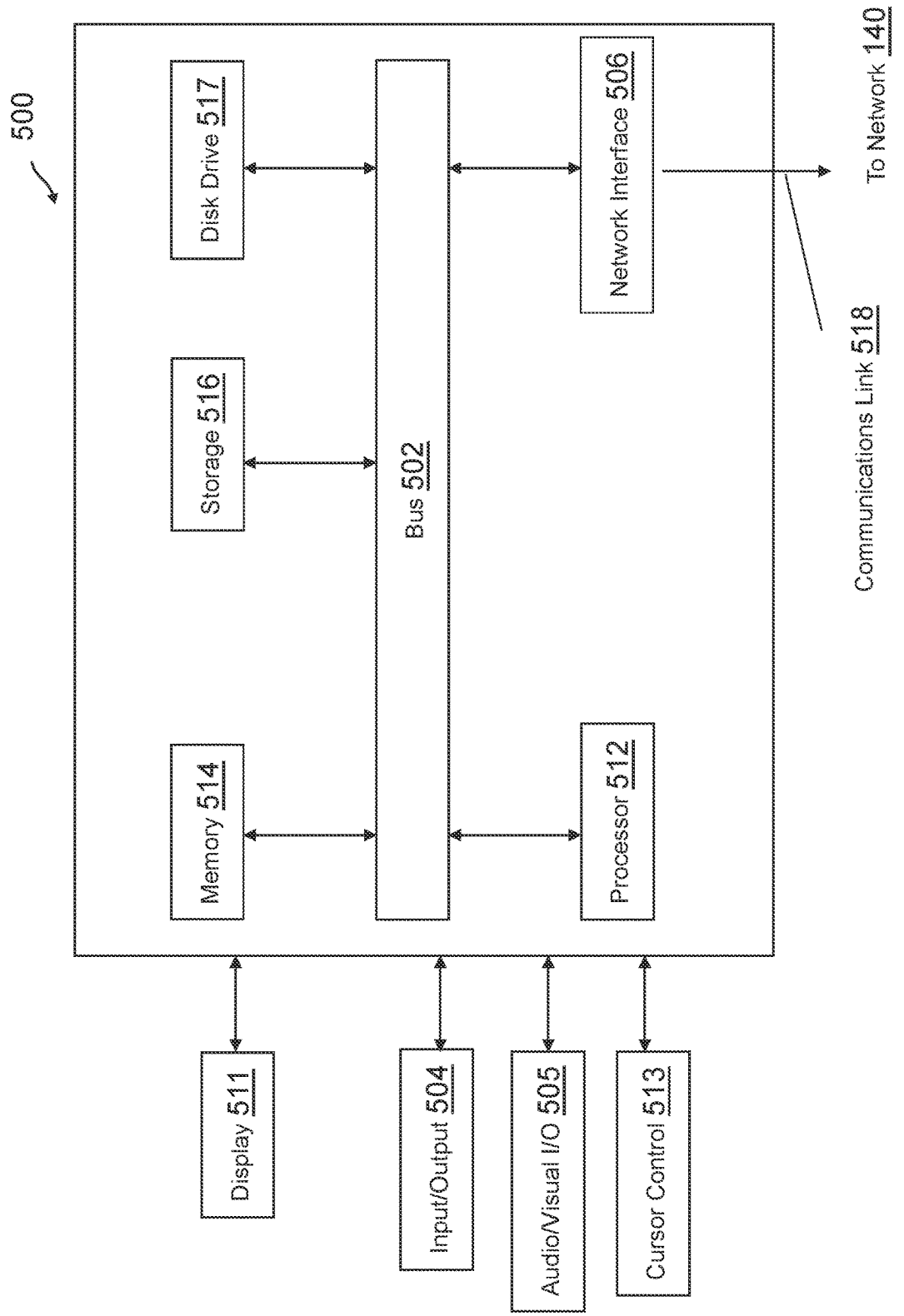
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
   a non-transitory memory; and
   one or more hardware processors coupled to the non-transitory memory and configured to read instructions from the non-transitory memory to cause the service provider system to perform operations comprising:
   receiving a security alert utilized by the service provider system for a security detection associated with computing logs monitored for the security detection, wherein the security alert comprises a plurality of modular components;
   determining a first modular component from the plurality of modular components for the security alert;
   determining a first sampling number for the computing logs;
   filtering a first portion of the computing logs associated with the first sampling number based on the first modular component;
   determining whether first filtered data from the filtered computing logs of the first portion meets a first expected proportion for the first sampling number of the computing logs, wherein the determining whether the first filtered data meets the first expected proportion includes increasing the filtered first data by a scalar for a comparison to the first expected proportion;
   successively filtering other portions of the computing logs further using other ones of the plurality of modular components, a plurality of sampling numbers, and a plurality of expected proportions; and
   determining whether to adjust an alert frequency for each of the plurality of modular components of the security alert based on the comparison and the successive filtering, wherein the determining whether to adjust the alert frequency includes increasing second filtered data from the successively filtered other portions by the scalar.

2. The service provider system of claim 1, wherein the successively filtering comprises:
   determining a second modular component for the security alert from the plurality of modular components;
   determining a second sampling number for computing logs generated during the security detection;
   filtering a second portion of the computing logs associated with the second sampling number based on the second modular component; and
   determining whether second filtered data from the second filtered computing logs from the second portion meets a second expected proportion for the second sampling number of the computing logs.

3. The service provider system of claim 2, wherein the successively filtering further comprises:
   successively further filtering the computing logs until all of the plurality of modular components are utilized for the successively filtering; and
   determining whether each of the plurality of modular components meet the plurality of expected proportions of corresponding one of the plurality of sampling numbers of the computing logs.

4. The service provider system of claim 2, wherein the plurality of sampling numbers for the plurality of modular components is progressively increased in scale during the successively filtering.

5. The service provider system of claim 1, wherein if one of the plurality of modular components does not meet a corresponding one of expected proportions for a corresponding one of the plurality of sampling numbers, the operations further comprise:
   flagging the one of the plurality of modular components for tuning of the security alert.

6. The service provider system of claim 5, wherein the operations further comprise:
   determining one of the computing logs associated with the one of the plurality of modular components based on the flagging; and
   querying a user associated with the one of the computing logs for a justification for the security alert generated from the one of the computing logs.

7. The service provider system of claim 6, wherein the operations further comprise:
   receiving the justification from the user;
   determining a total number of justifications from the user and at least one additional user meets or exceeds a justification threshold; and
   excluding additional security alerts generated based at least one the one of the computing logs based on the total number of justifications meeting or exceeding the justification threshold.

8. The service provider system of claim 6, wherein the operations further comprise:
   querying a plurality of users associated with additional ones of the computing logs associated with the one of the plurality of modular components based on the flagging, wherein the querying is limited based on a number of true positive results over a previous time period.

9. The service provider system of claim 1, wherein the determining whether to adjust the alert frequency comprises:
   determining that each of the plurality of modular components meets a corresponding one of expected proportions for a corresponding one of the plurality of sampling amounts; and
   marking the security alert as ready for deployment.

10. The service provider system of claim 1, wherein the increasing the first filtered data comprises:
    increasing a number of the computing logs in the first filtered computing logs from the first portion by the scalar, wherein the scalar is associated with the first sampling number,
    and wherein the determining whether the first filtered data meets the first expected proportion further includes comparing the increased number of the computing logs in the first filtered computing logs from the first portion to the first expected proportion of the computing logs for the first modular component.

11. The service provider system of claim 1, wherein the determining whether to adjust an alert frequency comprises:
    determining that the first modular component requires an adjustment based on the comparison; and
    providing a warning notification of the adjustment for the first modular component in a user interface displaying the first sampling amount, the first filtered data, and code for the first modular component.

12. The service provider system of claim 10, wherein the determining whether to adjust an alert frequency comprises:
    determining that the first modular component does not require an adjustment based on the comparing; and
    providing an approval notification of the first module component in a user interface displaying code for the first modular component, the first sampling amount, and the first filtered data.

13. The service provider system of claim 1, wherein the computing logs are selected over a time frame for the security detection, and wherein the time frame is adjustable by at least one of date, time, or length of time for testing the plurality of modular components of the security alert.

14. A method comprising:
    receiving a security alert utilized by a service provider system for a security detection associated with computing logs monitored for the security detection, wherein the security alert comprises a plurality of modular components;
    determining a first modular component from the plurality of modular components for the security alert;
    determining a first sampling number for the computing logs;
    filtering a first portion of the computing logs associated with the first sampling number based on the first modular component;
    determining whether first filtered data from the filtered computing logs of the first portion meets a first expected proportion for the first sampling number of the computing logs, wherein the determining whether the first filtered data meets the first expected proportion includes increasing the filtered first data by a scalar for a comparison to the first expected proportion;
    successively filtering other portions of the computing logs further using other ones of the plurality of modular components, a plurality of sampling numbers, and a plurality of expected proportions; and
    determining whether to adjust an alert frequency for each of the plurality of modular components of the security alert based on the comparison and the successive filtering, wherein the determining whether to adjust the alert frequency includes increasing second filtered data from the successively filtered other portions by the scalar.

15. The method of claim 14, wherein the successively filtering comprises:
    determining a second modular component for the security alert from the plurality of modular components;
    determining a second sampling number for computing logs generated during the security detection;
    filtering a second portion of the computing logs associated with the second sampling number based on the second modular component; and
    determining whether second filtered data from the second filtered computing logs from the second portion meets a second expected proportion for the second sampling number of the computing logs.

16. The method of claim 15, wherein the successively filtering further comprises:
    successively further filtering the computing logs until all of the plurality of modular components are utilized for the successively filtering; and
    determining whether each of the plurality of modular components meet the plurality of expected proportions of corresponding one of the plurality of sampling numbers of the computing logs.

17. The method of claim 15, wherein the plurality of sampling numbers for the plurality of modular components is progressively increased in scale during the successively filtering.

18. The method of claim 14, wherein if one of the plurality of modular components does not meet a corresponding one of expected proportions for a corresponding one of the plurality of sampling numbers, the method further comprises:
    flagging the one of the plurality of modular components for tuning of the security alert.

19. The method of claim 14, wherein the increasing the first filtered data comprises:

increasing a number of the computing logs in the first filtered computing logs from the first portion by the scalar, wherein the scalar is associated with the first sampling number, and wherein the determining whether the first filtered data meets the first expected proportion further includes comparing the increased number of the computing logs in the first filtered computing logs from the first portion to the first expected proportion of the computing logs for the first modular component.

20. A non-transitory machine-readable medium having stored thereon machine-readable instructions executable to cause a machine to perform operations comprising:

receiving a security alert utilized by a service provider system for a security detection associated with computing logs monitored for the security detection, wherein the security alert comprises a plurality of modular components;

determining a first modular component from the plurality of modular components for the security alert;

determining a first sampling number for the computing logs;

filtering a first portion of the computing logs associated with the first sampling number based on the first modular component;

determining whether first filtered data from the filtered computing logs of the first portion meets a first expected proportion for the first sampling number of the computing logs, wherein the determining whether the first filtered data meets the first expected proportion includes increasing the filtered first data by a scalar for a comparison to the first expected proportion;

successively filtering other portions of the computing logs further using other ones of the plurality of modular components, a plurality of sampling numbers, and a plurality of expected proportions; and determining whether to adjust an alert frequency for each of the plurality of modular components of the security alert based on the comparison and the successive filtering, wherein the determining whether to adjust the alert frequency includes increasing second filtered data from the successively filtered other portions by the scalar.

\* \* \* \* \*